United States Patent Office.

JAMES C. SICKEL, OF PHILADELPHIA, PENNSYLVANIA.

Letters Patent No. 75,992, dated March 24, 1868.

IMPROVED COMPOSITION FOR EMBALMING.

The Schedule referred to in these Letters Patent and making part of the same.

Be it known that I, JAMES C. SICKEL, of the city and county of Philadelphia, State of Pennsylvania, have invented a new and useful Composition for Embalming, or preventing from putrefaction cadavers or other matter; and that I do hereby declare that the following is a clear and exact description thereof.

I take glycerine and alcohol, equal parts, pass through the mixture sulphurous-acid gas, ($SO_2$,) and flavor it with acetic acid and oil of cloves, or any other similar antiseptic essential oil, to the requisite quantity.

It is then ready to be applied to the cadaver or other matter to be preserved, in the following manner:

I first inject the above composition into every natural opening of the subject to be preserved. I then envelope or cover every part of the subject with linen bandages saturated with the said composition. I then cover the body, when bandaged as above described, with sheets of India rubber, or any other impervious substances.

I also inject the aorta of the dead subject with the above composition, in order to diffuse it by means of the arterial system through all parts of the body, and so prevent or at least retard the putrefaction to a considerable extent.

What I claim, and desire to secure as my invention, by Letters Patent, is—

The combination of glycerine, alcohol, and sulphurous acid, flavored with acetic acid and essential oils or flavors, for the preservation of dead bodies, in the manner described.

JAS. C. SICKEL.

Witnesses:
 OROZIO GANJO,
 EDWARD R. MORRELL.